US012431645B2

(12) United States Patent
Yi et al.

(10) Patent No.: US 12,431,645 B2
(45) Date of Patent: Sep. 30, 2025

(54) POWER CONNECTOR WITH IMPROVED CURRENT-CARRYING CAPACITY AND SOFTER PLUGGING FORCE

(71) Applicant: DONGGUAN LUXSHARE TECHNOLOGIES CO., LTD, Dongguan (CN)

(72) Inventors: Xiaogang Yi, Dongguan (CN); Kunlin Yao, Dongguan (CN); Hongji Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 293 days.

(21) Appl. No.: 18/237,434

(22) Filed: Aug. 24, 2023

(65) Prior Publication Data

US 2025/0038438 A1 Jan. 30, 2025

(30) Foreign Application Priority Data

Jul. 26, 2023 (CN) ......................... 202321978770.4

(51) Int. Cl.
*H01R 12/71* (2011.01)
*H01R 13/502* (2006.01)
*H01R 13/631* (2006.01)

(52) U.S. Cl.
CPC ......... *H01R 12/716* (2013.01); *H01R 13/502* (2013.01); *H01R 13/631* (2013.01)

(58) Field of Classification Search
CPC .. H01R 12/716; H01R 13/502; H01R 13/631; H01R 12/7088; H01R 13/113
See application file for complete search history.

(56) References Cited

U.S. PATENT DOCUMENTS

| | | | | |
|---|---|---|---|---|
| 11,201,419 | B2 * | 12/2021 | Hung | H01R 12/51 |
| 11,211,734 | B2 * | 12/2021 | Hung | H01R 13/6276 |
| 11,677,173 | B2 * | 6/2023 | Zhang | H01R 13/04 439/75 |
| 11,791,592 | B2 * | 10/2023 | Hung | H01R 13/502 439/607.05 |
| 2020/0161791 | A1 * | 5/2020 | Zou | H01R 12/721 |
| 2022/0102890 | A1 * | 3/2022 | Zhang | H01R 13/04 |
| 2024/0178600 | A1 * | 5/2024 | Zhang | H01R 12/721 |
| 2025/0038438 | A1 * | 1/2025 | Yi | H01R 13/502 |
| 2025/0038447 | A1 * | 1/2025 | Yao | H01R 13/428 |

* cited by examiner

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

A power connector includes an insulating body, a first power terminal, a second power terminal, a third power terminal and a fourth power terminal. The first power terminal includes a first elastic arm having a first contact surface. The second power terminal includes a second elastic arm having a second contact surface. The third power terminal includes a first deflecting portion and a third contact surface. The fourth power terminal includes a second deflecting portion and a fourth contact surface. The first contact surface and the third contact surface are disposed at intervals along a first direction to form double rows of contact points. The second contact surface and the fourth contact surface are disposed at intervals along the first direction to form double rows of contact points.

20 Claims, 10 Drawing Sheets

POWER CONNECTOR WITH IMPROVED CURRENT-CARRYING CAPACITY AND SOFTER PLUGGING FORCE

CROSS-REFERENCE TO RELATED APPLICATION

This patent application claims priority of a Chinese Patent Application No. 202321978770.4, filed on Jul. 26, 2023 and titled "POWER CONNECTOR", the entire content of which is incorporated herein by reference.

TECHNICAL FIELD

The present disclosure relates to a power connector, which belongs to a technical field of connectors.

BACKGROUND

A power connector in the related art generally includes an insulating body and a plurality of power terminals. The plurality of power terminals generally includes a first power terminal and a second power terminal. The first power terminal includes a first fixing portion and a plurality of first elastic arms. The second power terminal includes a second fixing portion and a plurality of second elastic arms. The plurality of first elastic arms and the plurality of second elastic arms are staggered.

The first elastic arm is provided with a first contact surface. The second elastic arm is provided with a second contact surface. The first contact surface and the second contact surface are located on a same row.

The staggered single-row design of power terminals in the related art loses a lot of current-carrying area, which limits the current-carrying capacity of the power terminals. With the continuous improvement of power transmission requirements, it puts forwardly higher requirements for the power transmission capacity of the power terminals, therefore the power terminals in the related art still have room for improvement.

SUMMARY

An object of the present disclosure is to provide a power connector with improved current-carrying capacity and softer plugging force.

In order to achieve the above object, the present disclosure adopts the following technical solution: a power connector, including: an insulating body including a mating surface and a mating slot extending through the mating surface along a first direction; the mating slot being configured to at least partially receive a mating power connector; and a plurality of power terminals including a first power terminal, a second power terminal, a third power terminal and a fourth power terminal; wherein the first power terminal includes a first fixing portion fixed to the insulating body and a first elastic arm extending from the first fixing portion; the first elastic arm includes a first contact surface; the second power terminal includes a second fixing portion fixed to the insulating body and a second elastic arm extending from the second fixing portion; the second elastic arm includes a second contact surface; the third power terminal includes a third fixing portion fixed to the insulating body and a third elastic arm extending from the third fixing portion; the third elastic arm includes a first deflecting portion; the third elastic arm includes a third contact surface; the fourth power terminal includes a fourth fixing portion fixed to the insulating body and a fourth elastic arm extending from the fourth fixing portion; the fourth elastic arm includes a second deflecting portion; the fourth elastic arm includes a fourth contact surface; the first elastic arm and the third elastic arm are located at one side of the mating slot; the first elastic arm extends beyond the third elastic arm along the first direction; the first contact surface and the third contact surface are disposed at intervals along the first direction; the first contact surface is flush with the third contact surface; the second elastic arm and the fourth elastic arm are located on another side of the mating slot; the second elastic arm extends beyond the fourth elastic arm along the first direction; the second contact surface and the fourth contact surface are disposed at intervals along the first direction; the second contact surface is flush with the fourth contact surface.

In order to achieve the above object, the present disclosure adopts the following technical solution: a power connector, including: an insulating body including a mating surface and a mating slot extending through the mating surface along a first direction; the mating slot being configured to at least partially receive a mating power connector; and a plurality of power terminals including a first power terminal, a second power terminal, a third power terminal and a fourth power terminal; wherein the first power terminal includes a first fixing portion and a first elastic arm extending from the first fixing portion; the first elastic arm includes a first contact surface provided on a bottom surface thereof; the second power terminal includes a second fixing portion and a second elastic arm extending from the second fixing portion; the second elastic arm includes a second contact surface provided on a top surface thereof; the third power terminal includes a third fixing portion and a third elastic arm extending from the third fixing portion; the third elastic arm includes a first deflecting portion protruding toward the first power terminal; the third elastic arm includes a third contact surface provided on a bottom surface thereof; the fourth power terminal includes a fourth fixing portion a fourth elastic arm extending from the fourth fixing portion; the fourth elastic arm includes a second deflecting portion protruding toward the second power terminal; the fourth elastic arm includes a fourth contact surface provided on a top surface thereof; the first elastic arm and the second elastic arm are symmetrically disposed on two sides of the mating slot; the third elastic arm and the fourth elastic arm are symmetrically disposed on the two sides of the mating slot; the first elastic arm extends beyond the third elastic arm along the first direction; the first contact surface and the third contact surface are disposed at intervals along the first direction; the first contact surface is flush with the third contact surface; the second elastic arm extends beyond the fourth elastic arm along the first direction; the second contact surface and the fourth contact surface are disposed at intervals along the first direction; the second contact surface is flush with the fourth contact surface.

Compared with the prior art, the power terminals in the present disclosure include the first power terminal, the second power terminal, the third power terminal and the fourth power terminal. The first power terminal includes the first elastic arm. The second power terminal includes the second elastic arm. The third power terminal includes the third elastic arm. The fourth power terminal includes the fourth elastic arm. Such arrangement increases the current-carrying area in contact with the mating power connector, has a higher current transmission capacity, and reduces heat generated by the power terminals when transmitting high current. In addition, the first contact surface of the first power terminal and the third contact surface of the third power terminal are disposed at intervals along the first direction to form double rows of contact points. The second contact surface of the second power terminal and the fourth contact surface of the fourth power terminal are disposed at intervals along the first direction to form double rows of contact points. Due to the sequential contact of the double-row contact points, the present disclosure makes the insertion and extraction force peak-staggered, thereby having a softer insertion and extraction force.

DETAILED DESCRIPTION

Figure 1:
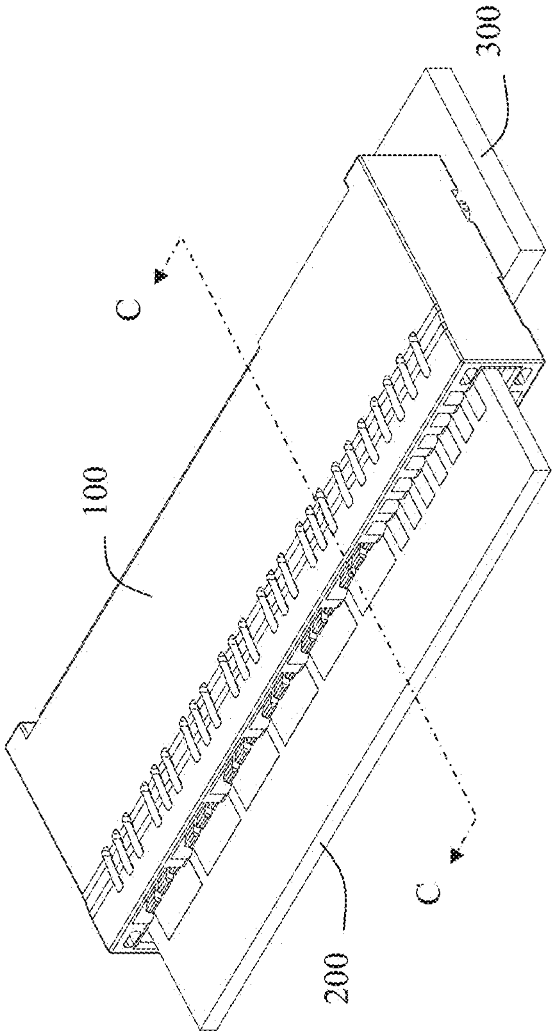
FIG. 1 is a perspective schematic view of a power connector when installed on a circuit board and mated with a mating power connector in accordance with an embodiment of the present disclosure.
Figure 2:
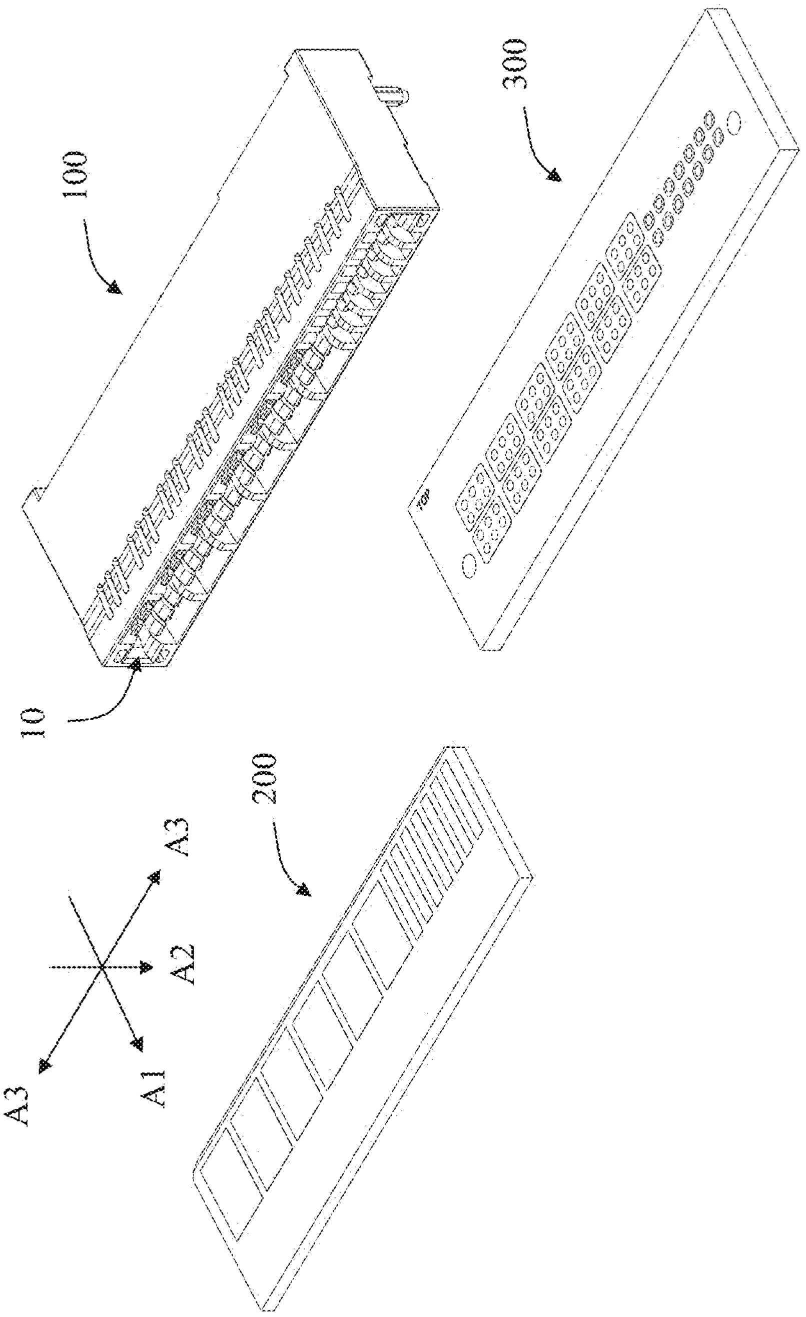
FIG. 2 is a perspective exploded view of FIG. 1.
Figure 3:
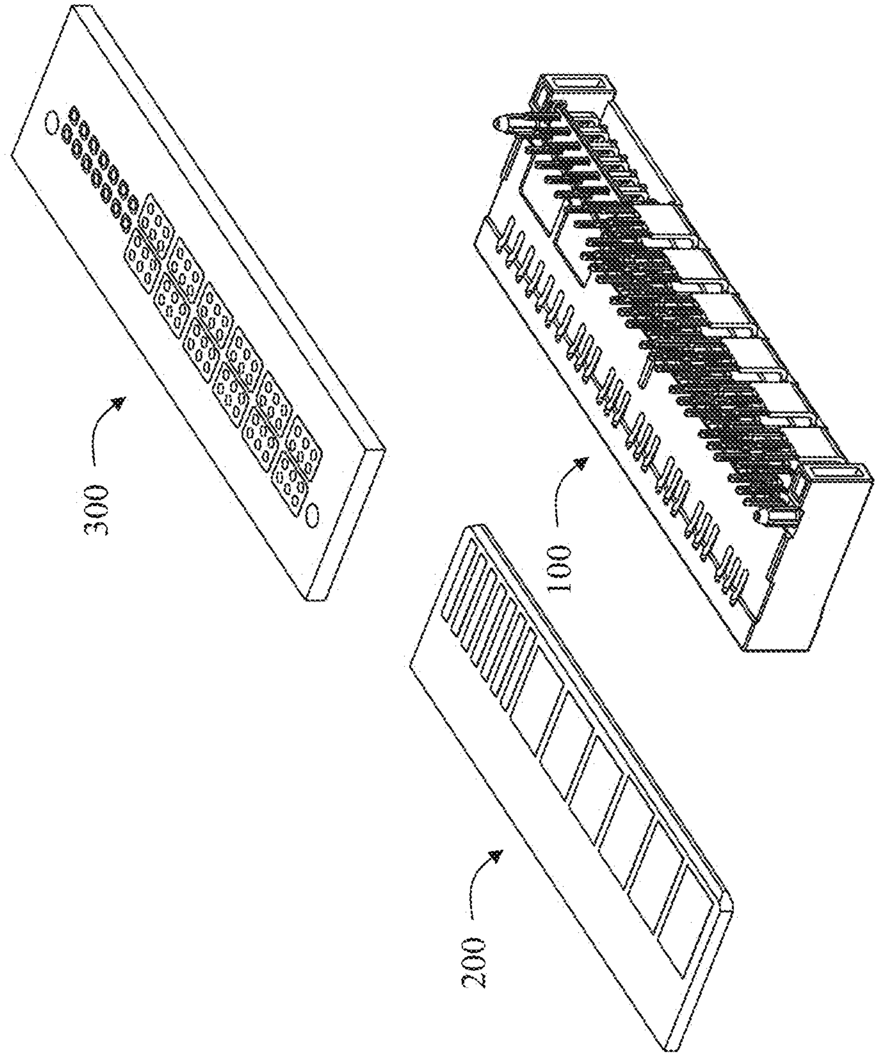
FIG. 3 is a perspective exploded view of FIG. 2 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 10, the present disclosure discloses a power connector 100 for mating with a mating power connector 200. The power connector 100 includes an insulating body 1, a plurality of power terminals 2, a plurality of first terminals 3 and a mounting block 4.

Figure 4:
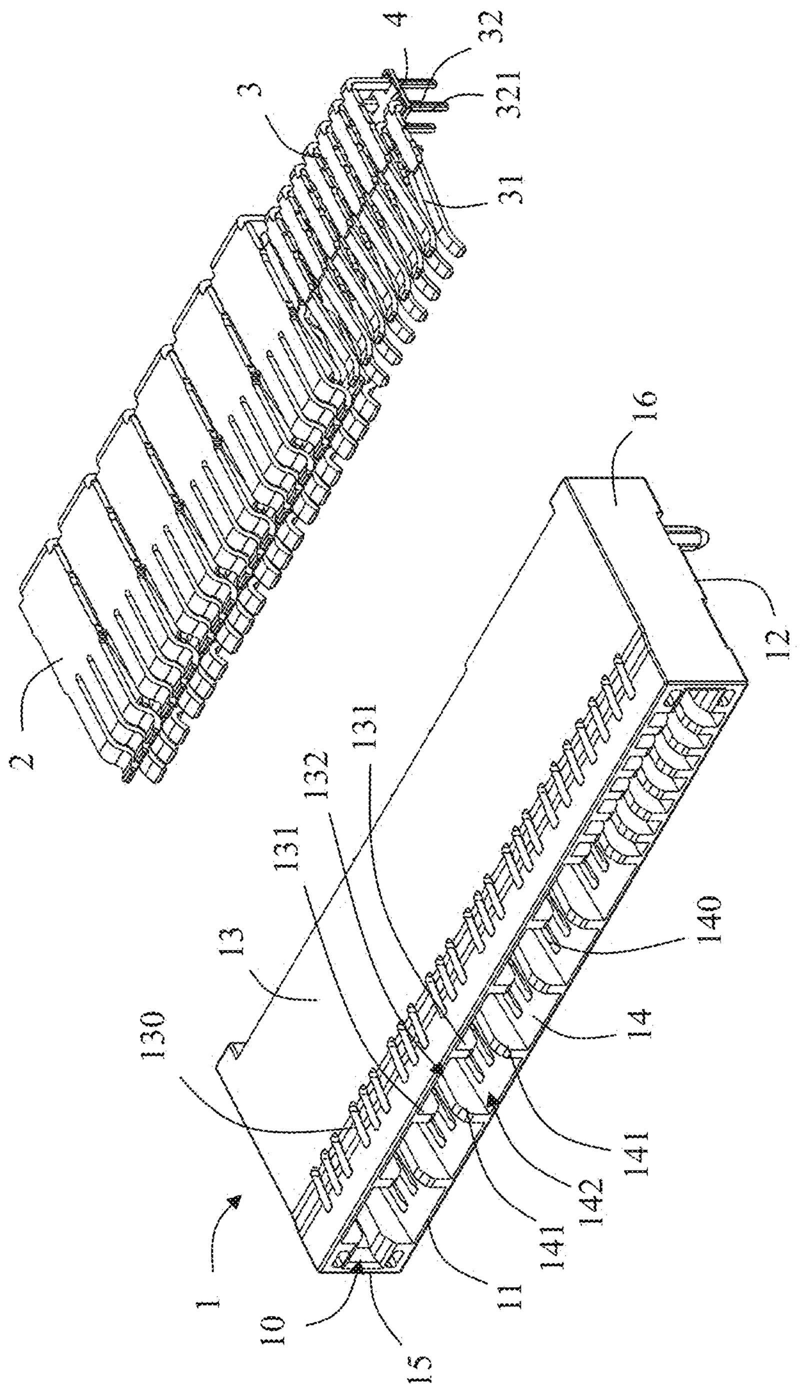
FIG. 4 is a partial perspective exploded view of the power connector shown in FIG. 2.
Figure 5:
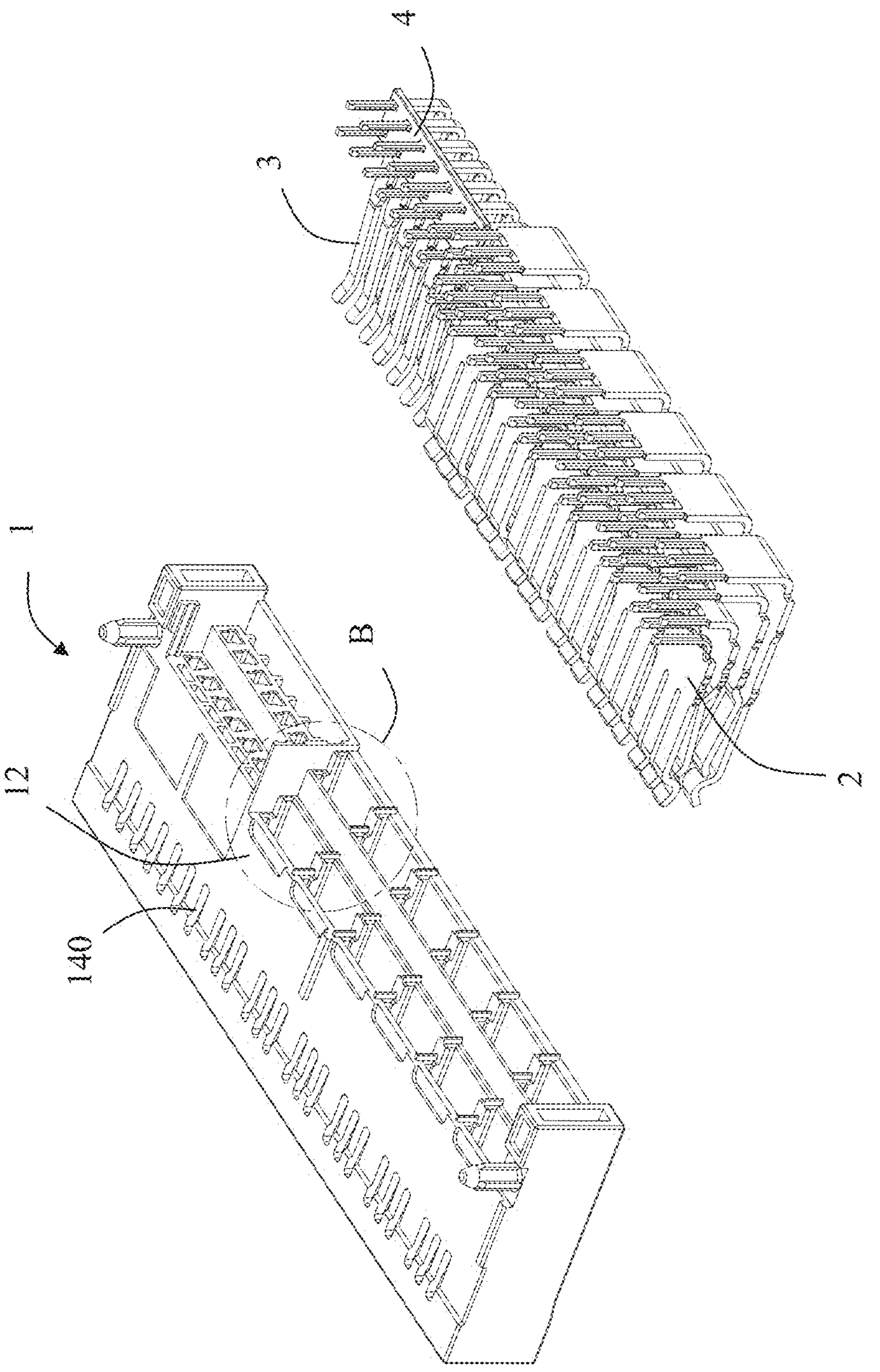
FIG. 5 is a partial perspective exploded view of FIG. 4 from another angle.

As shown in FIG. 4 and FIG. 5, the insulating body 1 includes a mating surface 11, a mounting surface 12 and a mating slot 10 extending through the mating surface 11 along a first direction A1 (for example, a rear-to-front direction). The mating slot 10 is configured to at least partially receive the mating power connector 200. The mounting surface 12 is configured for mounting the power connector 100 to a circuit board 300.

As shown in FIG. 4, each first terminal 3 is approximately L-shaped, and includes a contact arm 31 extending into the mating slot 10 and a bent portion 32 bent downwardly from the contact arm 31. The bent portion 32 includes a mounting tail portion 321 for being mounted to the circuit board 300.

The mounting block 4 defines a plurality of through holes (not numbered) corresponding to the mounting tail portions 321. The mounting block 4 is assembled and fixed to the insulating body 1. The mounting tail portions 321 pass through the through holes to extend downwardly beyond the mounting block 4, so as to ensure the position of each mounting tail portion 321, thereby facilitating the mounting of the mounting tail portions 321 to the circuit board 300.

Figure 6:
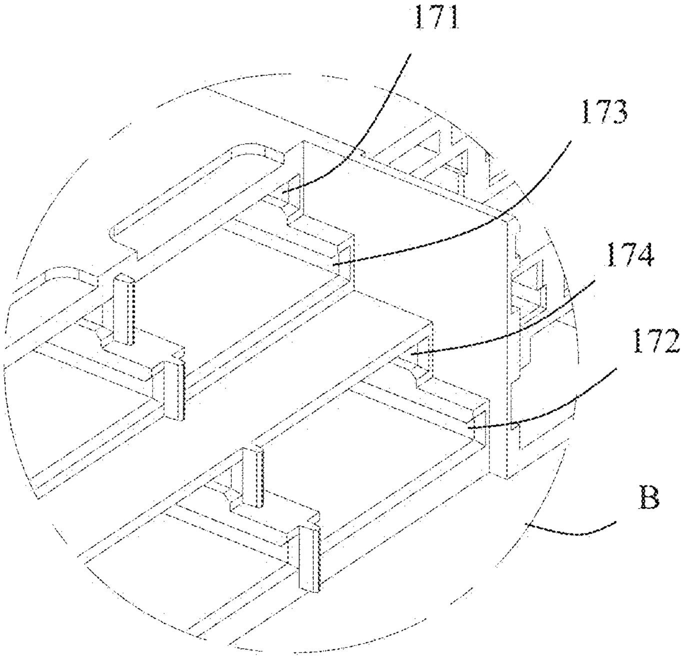
FIG. 6 is a partially enlarged view of a circled part B in FIG. 5.
Figure 7:
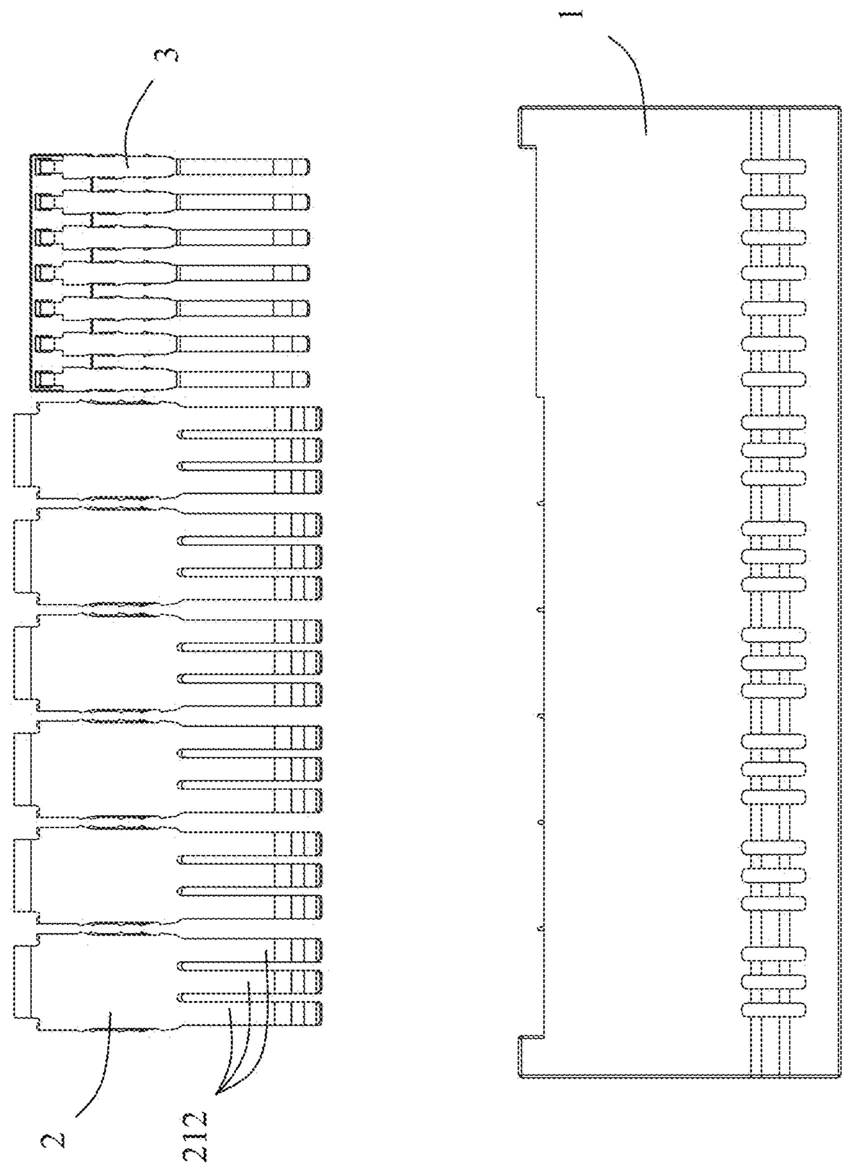
FIG. 7 is a top view of FIG. 4.

Referring to FIG. 4 and FIG. 5, the insulating body 1 includes a top wall 13, a bottom wall 14, a first side wall 15 connecting one end of the top wall 13 and one end of the bottom wall 14, and a second side wall 16 connecting the other end of the top wall 13 and the other end of the bottom wall 14. The mating slot 10 is surrounded by the top wall 13, the bottom wall 14, the first side wall 15 and the second side wall 16. The insulating body 1 further includes a plurality of first partition walls 131 protruding downwardly from a lower surface of the top wall 13 toward the mating slot 10. Two adjacent first partition walls 131 and the top wall 13 jointly form a U-shaped first receiving groove 132. Similarly, the insulating body 1 further includes a plurality of second partition walls 141 protruding upwardly from an upper surface of the bottom wall 14 toward the mating slot 10. Two adjacent second partition walls 141 and the bottom wall 14 jointly form a U-shaped second receiving groove 142. In the illustrated embodiment of the present disclosure, the first receiving groove 132 and the second receiving groove 142 at corresponding positions are aligned in a vertical direction. In addition, in order to improve the heat dissipation capability of the power connector 100, the top wall 13 further defines a plurality of first heat dissipation slots 130 extending through the top wall 13 along the vertical direction. The bottom wall 14 further defines a plurality of second heat dissipation slots 140 extending through the bottom wall 14 along the vertical direction. Referring to FIG. 4 to FIG. 6, the insulating body 1 further defines a first positioning slot 171 extending along the first direction A1, a second positioning slot 172 extending along the first direction A1, a third positioning slot 173 extending along the first direction A1, and a fourth positioning slot 174 extending along the first direction A1. The first positioning slot 171, the third positioning slot 173, the fourth positioning slot 174 and the second positioning slot 172 are disposed in sequence from top to bottom.

Figure 10:
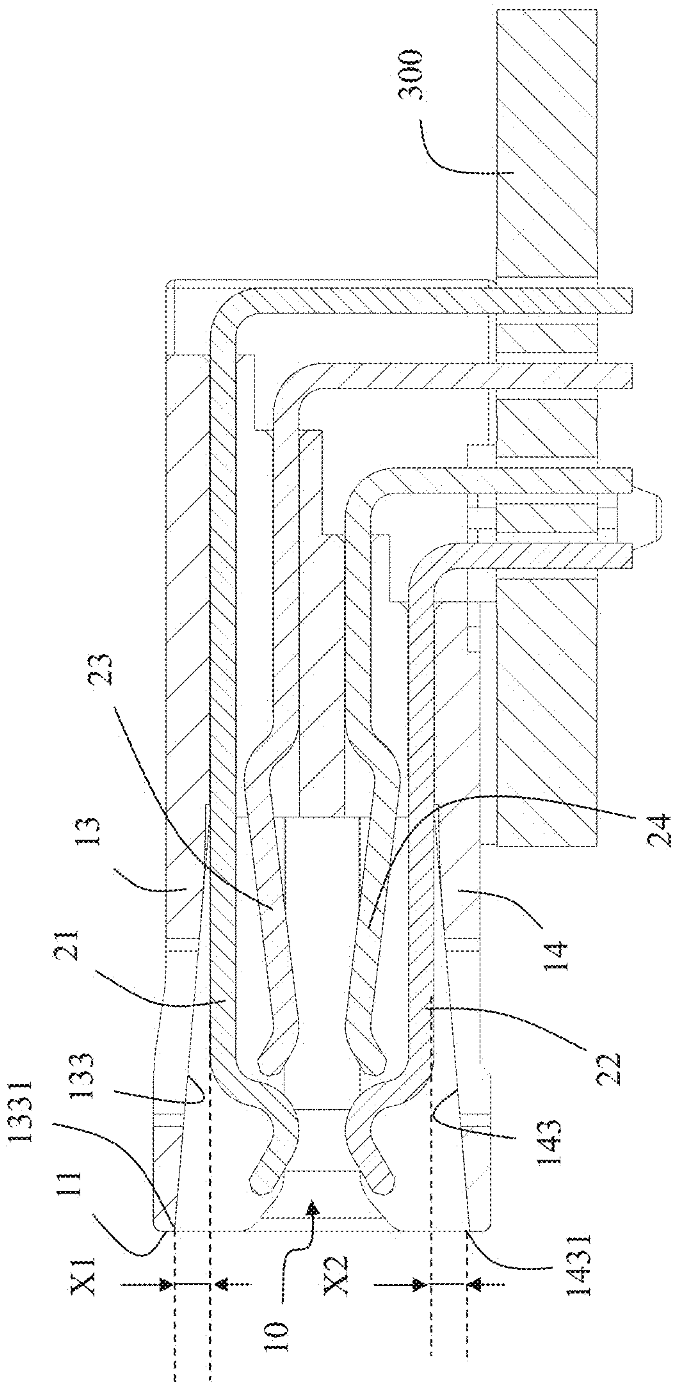
FIG. 10 is a schematic cross-sectional view taken along line C-C after removing the mating power connector in FIG. 1.

Besides, as shown in FIG. 10, the lower surface of the top wall 13 of the insulating body 1 further includes a first inclined surface 133 communicating with the mating slot 10. The upper surface of the bottom wall 14 of the insulating body 1 further includes a second inclined surface 143 communicating with the mating slot 10. The first inclined surface 133 and the second inclined surface 143 form a bell mouth configuration, and the closer to the mating surface 11, the wider the bell mouth. The first inclined surface 133 and the second inclined surface 143 are used to limit the maximum deformation of corresponding power terminals 2 when the mating power connector 200 is inserted (details will be described later). The first inclined surface 133 includes a first end surface 1331 reaching the mating surface 11. The second inclined surface 143 includes a second end surface 1431 reaching the mating surface 11.

Figure 8:
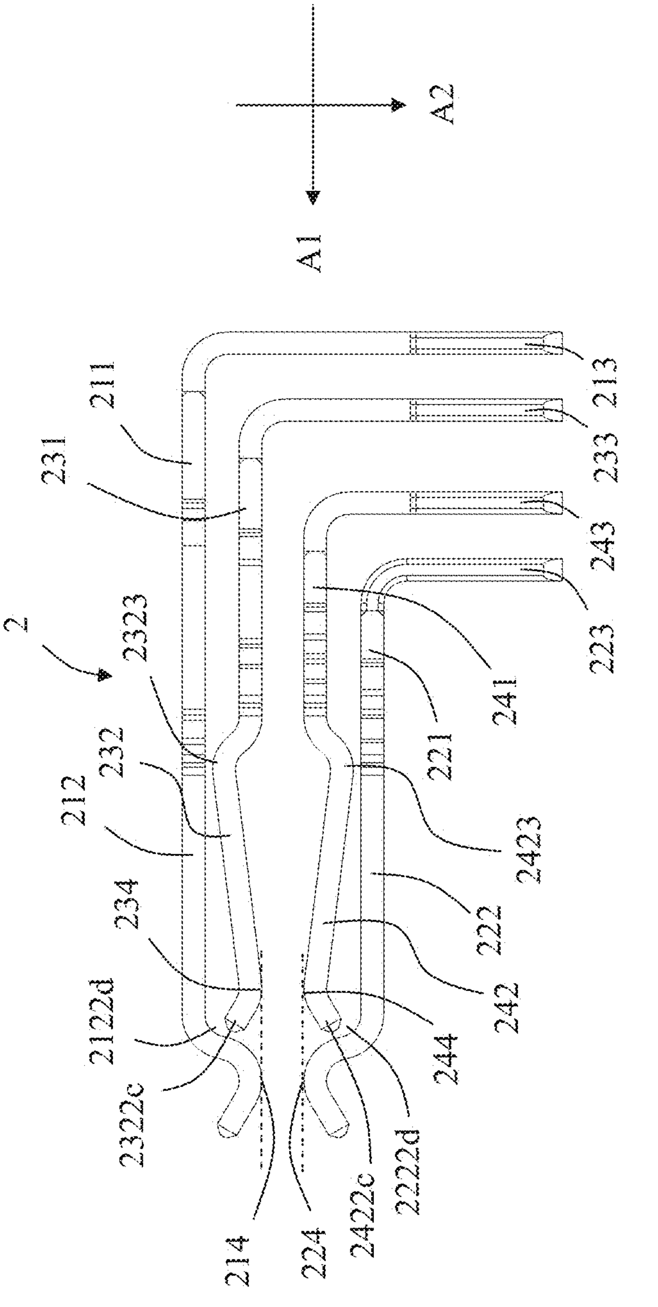
FIG. 8 is a right view of a plurality of power terminals in FIG. 4.
Figure 9:
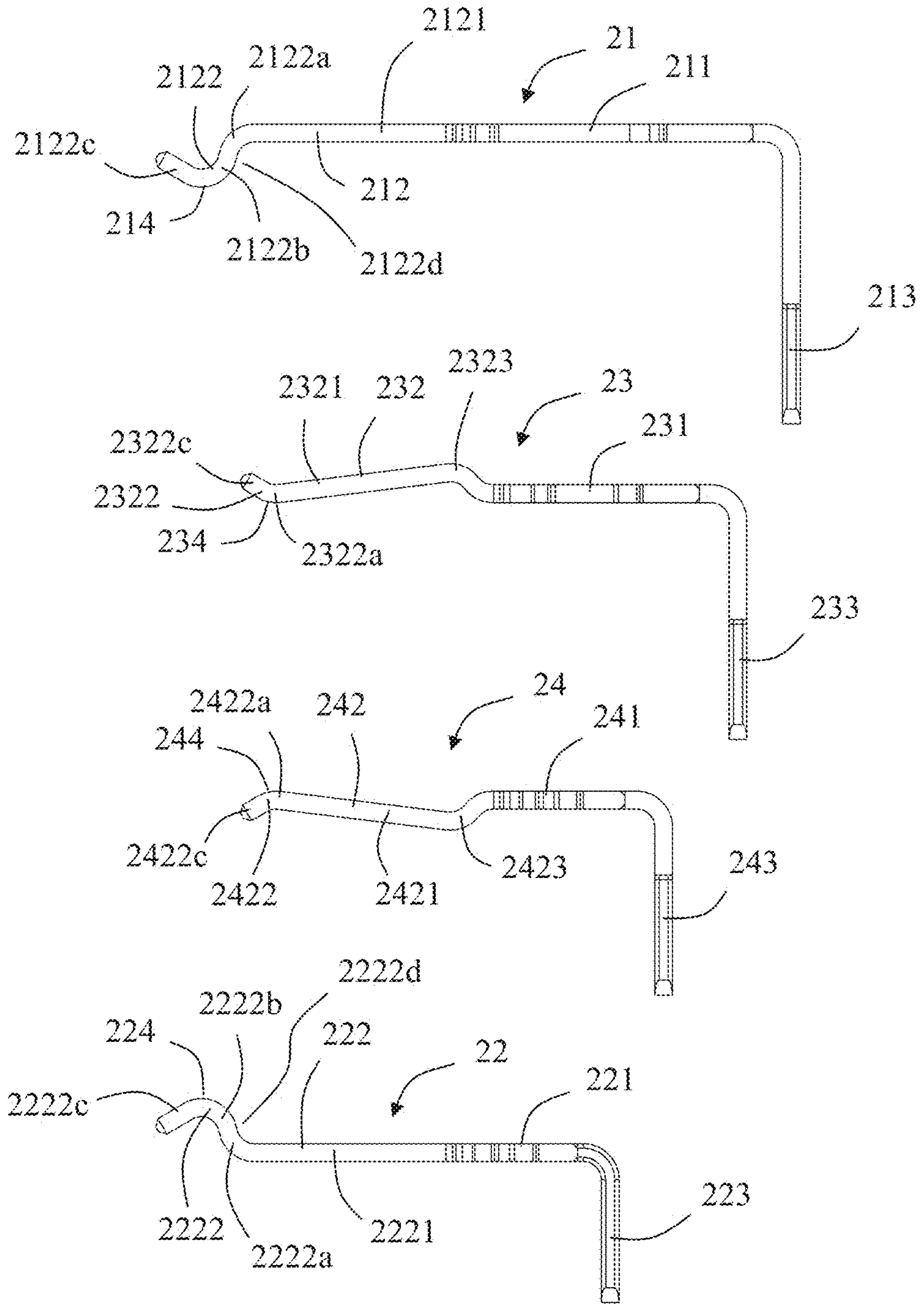
FIG. 9 is an exploded view of FIG. 8.

Referring to FIG. 8 to FIG. 10, in the embodiment illustrated in the present disclosure, the power terminals 2 include a first power terminal 21, a second power terminal 22, a third power terminal 23 and a fourth power terminal 24. The first power terminal 21 and the second power terminal 22 are located outside and form a first terminal group. The third power terminal 23 and the fourth power terminal 24 are located inside and form a second terminal group.

In the illustrated embodiment of the present disclosure, the first power terminal 21 includes a first fixing portion 211 fixed to the first positioning slot 171 of the insulating body 1, at least one first elastic arm 212 extending from one end of the first fixing portion 211, and a first mounting leg 213 bent downwardly from the other end of the first fixing portion 211. In the illustrated embodiment of the present disclosure, a plurality of first elastic arms 212 are provided and disposed at intervals along a third direction A3-A3. The first fixing portion 211 is fixed in the first positioning slot 171 in an interference fit manner, so as to ensure the stability of the installation of the first power terminal 21.

The first elastic arm 212 includes a first elastic base portion 2121 connected to the first fixing portion 211 and a first contact portion 2122 bent from the first elastic base portion 2121. The first elastic base portion 2121 extends along the first direction A1. The first contact portion 2122 includes a first bent portion 2122*a*, a second bent portion 2122*b*, and a first end portion 2122*c* connected to the second bent portion 2122*b*. In the illustrated embodiment of the present disclosure, the first bent portion 2122*a* and the second bent portion 2122*b* are connected to form an S-shaped configuration.

Specifically, in the illustrated embodiment of the present disclosure, the first bent portion 2122*a* extends forwardly and downwardly from the first elastic base portion 2121. The second bent portion 2122*b* extends downwardly and forwardly from the first bent portion 2122*a*. The first end portion 2122*c* extends forwardly and upwardly from the second bent portion 2122*b*. A bottom surface of the second bent portion 2122*b* includes a first contact surface 214 for contacting with the mating power connector 200.

The second power terminal 22 includes a second fixing portion 221 fixed to the second positioning slot 172 of the insulating body 1, at least one second elastic arm 222 extending from one end of the second fixing portion 221, and a second mounting leg 223 bent downwardly from the other end of the second fixing portion 221. In the illustrated embodiment of the present disclosure, a plurality of second elastic arms 222 are provided and disposed at intervals along the third direction A3-A3. The second fixing portion 221 is fixed in the second positioning slot 172 in an interference fit manner, so as to ensure the installation stability of the second power terminal 22.

The second elastic arm 222 includes a second elastic base portion 2221 connected to the second fixing portion 221 and a second contact portion 2222 bent from the second elastic base portion 2221. The second elastic base portion 2221 extends along the first direction A1. The second contact portion 2222 includes a third bent portion 2222*a*, a fourth bent portion 2222*b*, and a second end portion 2222*c* connected to the fourth bent portion 2222*b*. The third bent portion 2222*a* and the fourth bent portion 2222*b* are connected to form an S-shaped configuration.

Specifically, in the illustrated embodiment of the present disclosure, the third bent portion 2222*a* extends forwardly and upwardly from the second elastic base portion 2221. The fourth bent portion 2222*b* extends upwardly and forwardly from the third bent portion 2222*a*. The second end portion 2222*c* extends forwardly and downwardly from the fourth bent portion 2222*b*. A top surface of the fourth bent portion 2222*b* includes a second contact surface 224 for contacting with the mating power connector 200.

In the illustrated embodiment of the present disclosure, the first end portion 2122*c* is inclined in a direction away from the second end portion 2222*c*; and the second end portion 2222*c* is inclined in a direction away from the first end portion 2122*c*, so that the first end portion 2122*c* and the second end portion 2222*c* form a first bell mouth, thereby facilitating insertion of the mating power connector 200.

In the illustrated embodiment of the present disclosure, the power connector 100 includes a first space 2122*d* located behind the first bent portion 2122*a* and the second bent portion 2122*b*, and a second space 2222*d* located behind the third bent portion 2222*a* and the fourth bent portion 2222*b*.

The third power terminal 23 includes a third fixing portion 231 fixed to the third positioning slot 173 of the insulating body 1, at least one third elastic arm 232 extending from one end of the third fixing portion 231, and a third mounting leg 233 bent downwardly from the other end of the third fixing portion 231. In the illustrated embodiment of the present disclosure, a plurality of third elastic arms 232 are provided and disposed at intervals along the third direction A3-A3 (for example, a left-right direction). The third fixing portion 231 is fixed in the third positioning slot 173 in an interference fit manner, so as to ensure the stability of the installation of the third power terminal 23.

The third elastic arm 232 includes a first deflecting portion 2323 that is deflected from the third fixing portion 231 toward the first fixing portion 211 and is located close to the first fixing portion 211, a third elastic base portion 2321 extending forwardly and downwardly from the first deflecting portion 2323, and a third contact portion 2322 bent from the third elastic base portion 2321. The third contact portion 2322 is roughly V-shaped. The third contact portion 2322 includes a fifth bent portion 2322*a* and a third end portion 2322*c* connected to the fifth bent portion 2322*a*. A bottom surface of the fifth bent portion 2322*a* includes a third contact surface 234 for contacting with the mating power connector 200. The third end portion 2322*c* at least partially extends into the first space 2122*d*.

The fourth power terminal 24 includes a fourth fixing portion 241 fixed to the fourth positioning slot 174 of the insulating body 1, at least one fourth elastic arm 242 extending from one end of the fourth fixing portion 241, and a fourth mounting leg 243 bent downwardly from the other end of the fourth fixing portion 241. In the illustrated embodiment of the present disclosure, a plurality of fourth elastic arms 242 are provided and disposed at intervals along the third direction A3-A3. The fourth fixing portion 241 is fixed in the fourth positioning slot 174 in an interference fit manner, so as to ensure the stability of the installation of the fourth power terminal 24.

The fourth elastic arm 242 includes a second deflecting portion 2423 that is deflected from the fourth fixing portion 241 toward the second fixing portion 221 and is located close to the second fixing portion 221, a fourth elastic base portion 2421 extending forwardly and upwardly from the second deflecting portion 2423, and a fourth contact portion 2422 bent from the fourth elastic base portion 2421. The fourth contact portion 2422 is roughly V-shaped. The fourth contact portion 2422 includes a sixth bent portion 2422*a* and a fourth end portion 2422*c* connected to the sixth bent portion 2422*a*. A top surface of the sixth bent portion 2422*a* includes a fourth contact surface 244 for contacting with the mating power connector 200. The fourth end portion 2422*c* at least partially extends into the second space 2222*d*. In the embodiment shown in the present disclosure, by correspondingly hiding the third end portion 2322*c* and the fourth end portion 2422*c* behind the first contact portion 2122 and the second contact portion 2222, respectively, it is possible to protecting the third end portion 2322*c* and the fourth end portion 2422*c*, thereby avoiding the third end portion 2322*c* and the fourth end portion 2422*c* from being damaged by the mating power connector 200. At the same time, the insulating body 1 does not need to be provided with a structure for protecting the third end portion 2322*c* and the fourth end portion 2422*c* from being damaged by the mating power connector 200.

The third end portion 2322*c* is inclined away from the fourth end portion 2422*c*; and the fourth end portion 2422*c* is inclined away from the third end portion 2322*c*, so that the third end portion 2322*c* and the fourth end portion 2422*c* form a second bell mouth, thereby facilitating the insertion of the mating power connector 200.

In the illustrated embodiment of the present disclosure, the first elastic arm 212 and the third elastic arm 232 are located on one side (for example, an upper side) of the mating slot 10. The first elastic arm 212 extends beyond the third elastic arm 232 along the first direction A1. The first contact surface 214 and the third contact surface 234 are disposed at intervals along the first direction A1. The first contact surface 214 is flush with the third contact surface 234, that is, they are located in a same horizontal plane.

Similarly, the second elastic arm 222 and the fourth elastic arm 224 are located on the other side (for example, a lower side) of the mating slot 10. The second elastic arm 222 extends beyond the fourth elastic arm 242 along the first direction A1. The second contact surface 224 and the fourth contact surface 244 are disposed at intervals along the first direction A1. The second contact surface 224 is flush with the fourth contact surface 244, that is, they are located in a same horizontal plane.

In the embodiment shown in the present disclosure, the first fixing portion 211, the third fixing portion 231, the fourth fixing portion 241 and the second fixing portion 221 are disposed at intervals in sequence along a second direction A2 (for example, a top-to-bottom direction). Each two of the first direction A1, the second direction A2 and the third directions A3-A3 are perpendicular to each other. The fourth fixing portion 241 extends backwardly beyond the second fixing portion 221. The third fixing portion 231 extends backwardly beyond the fourth fixing portion 241. The first fixing portion 211 extends backwardly beyond the third fixing portion 231. The first mounting leg 213, the third mounting leg 233, the fourth mounting leg 243 and the second mounting leg 223 are disposed at intervals in sequence along the first direction A1.

In the illustrated embodiment of the present disclosure, the first elastic arm 212 and the second elastic arm 222 are symmetrically disposed on two sides (for example, upper and lower sides) of the mating slot 10. The third elastic arm 232 and the fourth elastic arm 242 are symmetrically disposed on two sides (for example, the upper and lower sides) of the mating slot 10.

Compared with the prior art, the power terminals 2 of the present disclosure include the first power terminal 21, the second power terminal 22, the third power terminal 23 and the fourth power terminal 24. The first power terminal 21 includes the first elastic arm 212. The second power terminal 22 includes the second elastic arm 222. The third power terminal 23 includes the third elastic arm 232. The fourth power terminal 24 includes the fourth elastic arm 242. Such arrangement increases the current-carrying area in contact with the mating power connector 200, has a higher current transmission capacity, and reduces heat generated by the power terminal when transmitting large current.

In addition, the first contact surface 214 of the first power terminal 21 and the third contact surface 234 of the third power terminal 23 are disposed at intervals along the first direction A1 to form double rows of contact points. The second contact surface 224 of the second power terminal 22 and the fourth contact surface 244 of the fourth power terminal 24 are disposed at intervals along the first direction A1 to form double rows of contact points. Due to the sequential contact of the double-row contact points, the present disclosure makes the insertion and extraction force peak-staggered, thereby having a softer insertion and extraction force. Specifically, in the illustrated embodiment of the present disclosure, the first contact surface 214 and the second contact surface 224 contact the mating power connector 200 at first. Then, the second contact surface 224 and the fourth contact surface 244 contact the mating power connector 200.

During the insertion process of the mating power connector 200, the first elastic arm 212 of the first power terminal 21 and the third elastic arm 232 of the third power terminal 23 do not interfere with each other; and the second elastic arm 222 of the second power terminal 22 does not interfere with the fourth elastic arm 242 of the fourth power terminal 24.

In the illustrated embodiment of the present disclosure, the first power terminal 21 and the third power terminal 23 are not in contact with each other; and the second power terminal 22 and the fourth power terminal 24 are not in contact with each other Such arrangement increases the current-carrying area of the inner and outer power terminals, thereby improving the current-carrying capacity.

Preferably, the first power terminal 21, the second power terminal 22, the third power terminal 23 and the fourth power terminal 24 are all made of highly elastic and highly conductive materials (such as copper), while ensuring contact force and current carrying capacity.

Referring to FIG. 10, a distance between an upper surface of the first elastic base portion 2121 and the first end surface 1331 is X1, where 0.5 mm≤X1≤1.2 mm. Similarly, a distance between a lower surface of the second elastic base portion 2221 and the second end surface 1431 is X2, where 0.5 mm≤X2≤1.2 mm. By setting the distance X1 and the distance X2 within this range, after the mating power connector 200 is inserted in place, it prevents the first elastic arm 212 and the second elastic arm 222 from interfering with the insulating body 1 after deformation.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A power connector, comprising:

an insulating body comprising a mating surface and a mating slot extending through the mating surface along a first direction; the mating slot being configured to at least partially receive a mating power connector; and a plurality of power terminals comprising a first power terminal, a second power terminal, a third power terminal and a fourth power terminal;

wherein the first power terminal comprises a first fixing portion fixed to the insulating body and a first elastic arm extending from the first fixing portion; the first elastic arm comprises a first contact surface;

the second power terminal comprises a second fixing portion fixed to the insulating body and a second elastic arm extending from the second fixing portion; the second elastic arm comprises a second contact surface;

the third power terminal comprises a third fixing portion fixed to the insulating body and a third elastic arm extending from the third fixing portion; the third elastic arm comprises a first deflecting portion; the third elastic arm comprises a third contact surface;

the fourth power terminal comprises a fourth fixing portion fixed to the insulating body and a fourth elastic arm extending from the fourth fixing portion; the fourth elastic arm comprises a second deflecting portion; the fourth elastic arm comprises a fourth contact surface;

the first elastic arm and the third elastic arm are located at one side of the mating slot; the first elastic arm extends beyond the third elastic arm along the first direction; the first contact surface and the third contact surface are disposed at intervals along the first direction; the first contact surface is flush with the third contact surface;

the second elastic arm and the fourth elastic arm are located on another side of the mating slot; the second elastic arm extends beyond the fourth elastic arm along the first direction; the second contact surface and the fourth contact surface are disposed at intervals along the first direction; the second contact surface is flush with the fourth contact surface.

2. The power connector according to claim 1, wherein the first elastic arm comprises a first elastic base portion connected to the first fixing portion and a first contact portion bent from the first elastic base portion; and the second elastic arm comprises a second elastic base portion connected to the second fixing portion and a second contact portion bent from the second elastic base portion.

3. The power connector according to claim 2, wherein the first elastic base portion extends along the first direction; the first contact portion comprises a first bent portion, a second bent portion, and a first end portion connected to the second bent portion; the first bent portion and the second bent portion are connected to form an S-shape configuration;

the second elastic base portion extends along the first direction; the second contact portion comprises a third bent portion, a fourth bent portion, and a second end portion connected to the fourth bent portion; the third bent portion and the fourth bent portion are connected to form an S-shaped configuration;

the first end portion is inclined in a direction away from the second end portion; and the second end portion is inclined in a direction away from the first end portion, so that the first end portion and the second end portion form a first bell mouth.

4. The power connector according to claim 3, wherein the first bent portion extends forwardly and downwardly from the first elastic base portion; the second bent portion extends downwardly and forwardly from the first bent portion; the first end portion extends forwardly and upwardly from the second bent portion; and the third bent portion extends forwardly and upwardly from the second elastic base portion; the fourth bent portion extends upwardly and forwardly from the third bent portion; the second end portion extends forwardly and downwardly from the fourth bent portion.

5. The power connector according to claim 4, wherein the third elastic arm comprises a third elastic base portion extending forwardly and downwardly from the first deflecting portion and a third contact portion bent from the third elastic base portion; the third contact portion comprises a fifth bent portion and a third end portion connected to the fifth bent portion;

the fourth elastic arm comprises a fourth elastic base portion extending forwardly and upwardly from the second deflecting portion and a fourth contact portion bent from the fourth elastic base portion; the fourth contact portion comprises a sixth bent portion and a fourth end portion connected to the sixth bent portion;

the third end portion is inclined in a direction away from the fourth end portion; and the fourth end portion is inclined away from the third end portion, so that the third end portion and the fourth end portion form a second bell mouth.

6. The power connector according to claim 5, wherein the first contact surface is provided on a bottom surface of the second bent portion; the second contact surface is provided on a top surface of the fourth bent portion; the third contact surface is provided on a bottom surface of the fifth bent portion; and the fourth contact surface is provided on a top surface of the sixth bent portion.

7. The power connector according to claim 5, wherein the power connector comprises a first space located behind the first bent portion and the second bent portion, and a second space located behind the third bent portion and the fourth bent portion; the third end portion at least partially extends into the first space; and the fourth end portion at least partially extends into the second space.

8. The power connector according to claim 1, wherein the first fixing portion, the third fixing portion, the fourth fixing portion and the second fixing portion are disposed at intervals in sequence along a second direction perpendicular to the first direction;

the fourth fixing portion extends backwardly beyond the second fixing portion; the third fixing portion extends backwardly beyond the fourth fixing portion; the first fixing portion extends backwardly beyond the third fixing portion;

the first power terminal further comprises a first mounting leg bent downwardly from a rear end of the first fixing portion; the second power terminal further comprises a second mounting leg bent downwardly from a rear end of the second fixing portion; the third power terminal further comprises a third mounting leg bent downwardly from a rear end of the third fixing portion; the fourth power terminal further comprises a fourth mounting leg bent downwardly from a rear end of the fourth fixing portion;

the first mounting leg, the third mounting leg, the fourth mounting leg and the second mounting leg are disposed at intervals in sequence along the first direction.

9. The power connector according to claim 1, wherein the first elastic arm and the second elastic arm are symmetrically disposed on two sides of the mating slot; the third elastic arm and the fourth elastic arm are symmetrically disposed on the two sides of the mating slot.

10. The power connector according to claim 1, wherein a plurality of first elastic arms are provided and disposed at intervals along a third direction perpendicular to the first direction; a plurality of second elastic arms are provided and disposed at intervals along the third direction; a plurality of third elastic arms are provided and disposed at intervals along the third direction; and a plurality of fourth elastic arms are provided and disposed at intervals along the third direction.

11. A power connector, comprising:

an insulating body comprising a mating surface and a mating slot extending through the mating surface along a first direction; the mating slot being configured to at least partially receive a mating power connector; and a plurality of power terminals comprising a first power terminal, a second power terminal, a third power terminal and a fourth power terminal;

wherein the first power terminal comprises a first fixing portion and a first elastic arm extending from the first fixing portion; the first elastic arm comprises a first contact surface provided on a bottom surface thereof;

the second power terminal comprises a second fixing portion and a second elastic arm extending from the second fixing portion; the second elastic arm comprises a second contact surface provided on a top surface thereof;

the third power terminal comprises a third fixing portion and a third elastic arm extending from the third fixing portion; the third elastic arm comprises a first deflecting portion protruding toward the first power terminal; the third elastic arm comprises a third contact surface provided on a bottom surface thereof;

the fourth power terminal comprises a fourth fixing portion a fourth elastic arm extending from the fourth fixing portion; the fourth elastic arm comprises a second deflecting portion protruding toward the second power terminal; the fourth elastic arm comprises a fourth contact surface provided on a top surface thereof;

the first elastic arm and the second elastic arm are symmetrically disposed on two sides of the mating slot, the third elastic arm and the fourth elastic arm are symmetrically disposed on the two sides of the mating slot;

the first elastic arm extends beyond the third elastic arm along the first direction; the first contact surface and the third contact surface are disposed at intervals along the first direction; the first contact surface is flush with the third contact surface;

the second elastic arm extends beyond the fourth elastic arm along the first direction; the second contact surface and the fourth contact surface are disposed at intervals along the first direction; the second contact surface is flush with the fourth contact surface.

12. The power connector according to claim 11, wherein the first elastic arm comprises a first elastic base portion connected to the first fixing portion and a first contact portion bent from the first elastic base portion; and the second elastic arm comprises a second elastic base portion connected to the second fixing portion and a second contact portion bent from the second elastic base portion.

13. The power connector according to claim 12, wherein the first elastic base portion extends along the first direction; the first contact portion comprises a first bent portion, a second bent portion, and a first end portion connected to the second bent portion; the first bent portion and the second bent portion are connected to form an S-shape configuration;

the second elastic base portion extends along the first direction; the second contact portion comprises a third bent portion, a fourth bent portion, and a second end portion connected to the fourth bent portion; the third bent portion and the fourth bent portion are connected to form an S-shaped configuration;

the first end portion is inclined in a direction away from the second end portion; and the second end portion is inclined in a direction away from the first end portion, so that the first end portion and the second end portion form a first bell mouth.

14. The power connector according to claim 13, wherein the first bent portion extends forwardly and downwardly from the first elastic base portion; the second bent portion extends downwardly and forwardly from the first bent portion; the first end portion extends forwardly and upwardly from the second bent portion; and the third bent portion extends forwardly and upwardly from the second elastic base portion; the fourth bent portion extends upwardly and forwardly from the third bent portion; the second end portion extends forwardly and downwardly from the fourth bent portion.

15. The power connector according to claim 14, wherein the third elastic arm comprises a third elastic base portion extending forwardly and downwardly from the first deflecting portion and a third contact portion bent from the third elastic base portion; the third contact portion comprises a fifth bent portion and a third end portion connected to the fifth bent portion;

the fourth elastic arm comprises a fourth elastic base portion extending forwardly and upwardly from the second deflecting portion and a fourth contact portion bent from the fourth elastic base portion; the fourth contact portion comprises a sixth bent portion and a fourth end portion connected to the sixth bent portion;

the third end portion is inclined in a direction away from the fourth end portion; and the fourth end portion is inclined away from the third end portion, so that the third end portion and the fourth end portion form a second bell mouth.

16. The power connector according to claim 15, wherein the power connector comprises a first space located behind the first bent portion and the second bent portion, and a second space located behind the third bent portion and the fourth bent portion; the third end portion at least partially extends into the first space; and the fourth end portion at least partially extends into the second space.

17. The power connector according to claim 11, wherein the first fixing portion, the third fixing portion, the fourth fixing portion and the second fixing portion are disposed at intervals in sequence along a second direction perpendicular to the first direction;

the fourth fixing portion extends backwardly beyond the second fixing portion; the third fixing portion extends backwardly beyond the fourth fixing portion; the first fixing portion extends backwardly beyond the third fixing portion;

the first power terminal further comprises a first mounting leg bent downwardly from a rear end of the first fixing portion; the second power terminal further comprises a second mounting leg bent downwardly from a rear end of the second fixing portion; the third power terminal further comprises a third mounting leg bent downwardly from a rear end of the third fixing portion; the fourth power terminal further comprises a fourth mounting leg bent downwardly from a rear end of the fourth fixing portion;

the first mounting leg, the third mounting leg, the fourth mounting leg and the second mounting leg are disposed at intervals in sequence along the first direction.

18. The power connector according to claim 11, wherein a plurality of first elastic arms are provided and disposed at intervals along a third direction perpendicular to the first direction; a plurality of second elastic arms are provided and disposed at intervals along the third direction; a plurality of third elastic arms are provided and disposed at intervals along the third direction; and a plurality of fourth elastic arms are provided and disposed at intervals along the third direction.

19. The power connector according to claim 12, wherein the insulating body comprises a first inclined surface and a second inclines surface which are exposed to the mating slot; the first inclines surface comprises a first end surface reaching the mating surface; the second inclined surface comprises a second end surface reaching the mating surface; a distance between an upper surface of the first elastic base portion and the first end surface 1331 is X1, where 0.5 mm≤X1≤1.2 mm; a distance between a lower surface of the second elastic base portion and the second end surface is X2, where 0.5 mm≤X2≤1.2 mm.

20. The power connector according to claim 11, wherein the insulating body comprises a top wall and a bottom wall opposite to the top wall; the mating slot is disposed between the top wall and the bottom wall; the top wall comprises a plurality of first partition walls protruding downwardly from a lower surface of the top wall; two adjacent first partition walls and the top wall jointly form a U-shaped first receiving groove in which the first elastic arm and the third elastic arm reside; and the insulating body comprises a plurality of second partition walls protruding upwardly from an upper surface of the bottom wall; two adjacent second partition walls and the bottom wall jointly form a U-shaped second receiving groove in which the second elastic arm and the fourth elastic arm reside.

* * * * *